United States Patent [19]

Baade et al.

[11] Patent Number: 5,093,450

[45] Date of Patent: * Mar. 3, 1992

[54] PROCESS FOR THE PREPARATION OF ETHYLENE/VINYL ACETATE COPOLYMERS WITH INCREASED STRENGTH, THE NEW ETHYLENE/VINYL ACETATE COPOLYMERS AND THEIR USE

[75] Inventors: Wolfgang Baade, Dormagen; Werner Obrecht, Moers; Christian Ohm, Leverkusen, all of Fed. Rep. of Germany

[73] Assignee: Bayer Akitengesellschaft, Bayerwerk, Fed. Rep. of Germany

[*] Notice: The portion of the term of this patent subsequent to Feb. 18, 2009 has been disclaimed.

[21] Appl. No.: 448,352

[22] Filed: Dec. 11, 1989

[30] Foreign Application Priority Data

Dec. 23, 1988 [DE] Fed. Rep. of Germany ....... 3843563

[51] Int. Cl.$^5$ .............................................. C08F 20/10
[52] U.S. Cl. ................................. 526/323.2; 526/331
[58] Field of Search .............................. 526/323.2, 331

[56] References Cited

U.S. PATENT DOCUMENTS

| 3,755,237 | 8/1973 | Isaacs et al. | 526/331 |
| 4,073,779 | 2/1978 | Wiest et al. | 526/331 |
| 4,078,136 | 3/1978 | Pietschmann et al. | 526/331 |
| 4,515,931 | 5/1985 | Olson et al. | 526/323.2 |
| 4,803,252 | 2/1989 | Kida et al. | 526/323.2 |

FOREIGN PATENT DOCUMENTS

| 0064242 | 6/1978 | Japan | 526/323.2 |
| 2059612 | 3/1987 | Japan | 526/323.2 |
| 2059613 | 3/1987 | Japan | 526/323.2 |

Primary Examiner—Joseph L. Schofer
Assistant Examiner—J. M. Reddick
Attorney, Agent, or Firm—Connolly and Hutz

[57] ABSTRACT

Ethylene/vinyl acetate solution polymers with increased strength and low gel content may be prepared by the copolymerization of small quantities of acryloyl or methacryloyl compounds.

2 Claims, No Drawings

PROCESS FOR THE PREPARATION OF ETHYLENE/VINYL ACETATE COPOLYMERS WITH INCREASED STRENGTH, THE NEW ETHYLENE/VINYL ACETATE COPOLYMERS AND THEIR USE

This invention relates to a discontinuous or preferably continuous process for the preparation of ethylene/vinyl acetate copolymers (EVA) with increased strength by solution polymerisation, using certain additional comonomers, to new ethylene/vinyl acetate copolymers containing copolymerised units of these additional comonomers and to the use of these copolymers as rheology modifiers, adhesive binders and compounding components for thermoplasts and duroplasts and for the production of vulcanisates.

It is known that ethylene and vinyl acetate may be radically copolymerised in varying proportions with random distribution of the monomers. If the copolymerised vinyl acetate content (hereinafter referred to as "vinyl acetate content" or "VA content") is low, the copolymers have the usual crystallinity of polyethylene at room temperature and are thermoplastic in character due to relatively long ethylene sequences (see H. Bartl, J. Peter, "Über Ethylen/Vinylacetat-Copolymerisate and ihre Vernetzung", Kautschuk und Gummi 14, WT 32 (1961); Winnacker-Küchler, Chem. Technologie, Volume 6, 4th Edition, chapter 2.2.7, "Ethylen-Vinylacetat-Copolymere", published by Carl Hanser Verlag, Munich-Vienna, 1982, pages 570 to 572; M. Arne, R. H. Schwaar, Report No. 155, Ethylene Copolymers, Process Economics Program, Menlo Park, Calif., pages 1 to 40 (1983)).

The copolymerisation may in principle be carried out by three different processes:
1. emulsion polymerisation,
2. solution polymerisation and
3. high pressure bulk polymerisation.

EVA with a low vinyl acetate content may be economically produced by high pressure bulk polymerisation (H. Bucka, R. Nitzsche, H. Onderka, Plaste und Kautschuk 30, 6, pages 302 to 305 (1983)). The polymerisation is generally carried out at pressures from 1000 to 3000 bar and at temperatures from 150° to 280° C. Products with vinyl acetate contents of up to 30% by weight prepared by this process may be used as hot melt adhesives and as rheology modifiers for crude oils and medium distillates and for cable sheaths.

The high pressure process is not suitable for the preparation of EVA copolymers with medium to high VA contents since it is difficult to obtain copolymers with high molecular weights and high Mooney viscosities at the polymerisation temperatures required for this process.

EVA copolymers with VA contents above 70% by weight are prepared predominantly by emulsion polymerisation. The usual conditions are pressures from 30 to 500 bar and temperatues from 20° to 100° C. The copolymer is generally not isolated from the dispersion obtained but directly used for further processing in the form of the aqueous dispersion (latex). Specially in this process, however, products with a very high gel content are obtained which are not usable as elastomeric solid rubber on account of their poor processing properties. Indeed in DE-OS 3 000 009 a process for the preparation of elastomeric ethylene/vinyl acetate copolymers with high Mooney viscosities and low gel contents is described, showing products which are emulsion copolymers with a copolymerised vinyl acetate content of 40 to 70% by weight obtained from aqueous solutions by coagulation of an ethylene/vinyl acetate copolymer latex. The properties of these ethylene/vinyl acetate copolymers are determined by the residual emulsifier which cannot be completely removed and which render the copolymers unsuitable for numerous applications.

EVA copolymers having a VA content of at least 30% by weight may also be prepared by a solution polymerisation process at medium pressure. The solvent used may be, for example, tertiary butanol or mixtures of tertiary butanol, methanol and hydrocarbons, in which the polymers remain in solution throughout the polymerisation process (DE-AS 11 26 613, 11 26 614 and 14 95 767, DE-OS 33 23 531, GB-P 807 112 and 843 974, FR-P 1 189 387, 1 225 704 and 1 238 589 and U.S. Pat. Nos. 2,396,785 and 2,947,735). The products obtained by this process are high molecular weight, slightly branched copolymers.

The solution polymerisation process is generally carried out in a train of 3 to 10 reactors at temperatures from 50° to 130° C. and pressures from 50 to 400 bar. Tertiary butanol is generally used as solvent in the presence of radical forming substances such as organic peroxides or azo compounds as polymerisation initiators. High molecular weight elastomeric copolymers with low gel contents and VA contents of 30 to 75% by weight are obtained. The vulcanisates of these products have tensile strengths of 10 to 13 MPa and tear strengths of 3.3 to 5 N/mm, depending on the VA content (determined in the test compounds disclosed in the Examples). A natural limit appeared to have been reached with these values, which apparently could not be exceeded by chemical modification of the EVA.

It was an object of the present invention to apply the solution polymerisation process for preparing EVA which was to be substantially free from gelled components and could be processed to vulcanisates with increased strength.

It was surprisingly found that the problem of the invention could be solved by the copolymerisation of small quantities of compounds containing at least two aryloyl or methacryloyl groups per molecule. The casual connection between the process according to the invention and the increased strength of the resulting vulcanisates with complete or almost complete avoidance of gelled polymer components is ensured but cannot as yet be explained. What is certain, however, is that the increased strength is not simply due to an increase in the molecular weight since the copolymerisation of other polyfunctional comonomers generally used for cross-linking and hence for increasing the molecular weight (e.g. divinyl benzene, triallyl cyanurate, diallyl phthalate, triallyl phosphate) has no significant positive effect and in many cases even a marked negative effect on the strength of the vulcanisates.

The present invention thus relates to a process for the preparation of ethylene/vinyl acetate copolymers containing from 40 to 90% by weight, preferably from 40 to 70% by weight of vinyl acetate incorporated by polymerisation, carried out by solution polymerisation of the monomers at pressures of 200 to 1000 bar and temperatures from 25° to 100° C., preferably from 30° to 80° C., characterised by polymerisation carried out in the presence of 50 ppm to 1% by weight, preferably from 200 ppm to 1% by weight, based on the quantity of polymerisable monomers put into the process, of (meth- )aryloyl compounds containing at least two acryloyl or methacryloyl groups per molecule.

(Meth)acryloyl compounds preferred for the process according to the invention include compounds with molecular weights from 126 to 1000, preferably from 126 to 500, e.g. acrylic acid anhydride, methacrylic acid anhydride, the acrylates and methacrylates of polyhydric, in particular dihydric and trihydric aliphatic, cycloaliphatic, araliphatic and aromatic alcohols containing from 2 to 24 carbon atoms per molecule, e.g. acrylates and methacrylates of ethylene glycol, propane-1,2- and -1,3-diol, butane-1,2-, -1,3-, -2,3- and 1,4-diol, neopentyl glycol, hexane diols, in particular hexan-1,6-diol, cyclohexane-1,4-diol, 1,4-bis(hydroxymethyl)-cyclohexane, hydroquinone, resorcinol, bis-phenol-A, ethoxylated bisphenol-A, and hydroquinone-di($\beta$-hydroxyethyl)-ether; also, the acrylates and methacrylates of glycerol, trimethylol ethane and -propane and phloroglucinol.

Acrylates and methacrylates of polyether polyols are also preferred (meth)acryloyl compounds, especially polyethylene and polypropylene glycols containing from 1 to 20, preferably 1 to 12 ether oxygen atoms per molecule, in particular the acrylates and methacrylates of di- and triethylene glycol and of di- and tri-propylene glycol.

The process according to the invention is initiated by radical forming substances. Suitable polymerisation initiators include radical forming agents which have decomposition half life values, determined in the solvent used for the process according to the invention, of 2 to 70 minutes at 70° C., e.g. peroxides, percarbonates, hydroperoxides, peresters and/or preferably radical forming azo compounds. Compounds of this type include e.g. tert.-amyl perneodecanoate, tert.-butyl perneodecanoate, dicyclohexyl peroxy dicarbonate, diisopropyl peroxy dicarbonate, acetyl cyclohexane sulphonylperoxide and, preferably, 2,2'-azo-bi(2,4-dimethylvaleronitrile) and 2,2'-azo-bis(4-methoxy-2,4-dimethyl-valeronitrile). The polymerisation initiators are generally used in quantities from 0.01 to 1.5% by weight, preferably from 0.1 to 1% by weight, based on the monomers put into the process.

Chain transfer agents are generally not used since vinyl acetate itself and the solvent show chain transfer. In exceptional cases, however, chain transfer agents are used for obtaining lower molecular weights. The chain transfer agents used for this purpose may be ketones such as acetone or diethyl ketone, aldehydes such as propionaldehyde or hydrocarbons such as propene or isooctane, used in quantities from 50 to 2000 ppm, preferably from 100 to 1000 ppm.

The process according to the invention may be carried out e.g. in stirred high pressure autoclaves. The continuous process, which is the preferred, is generally carried out using at least 4 reaction vessels.

The quantity of solvent to be used (e.g. tert.-butanol) is between 10 and 300% by weight, preferably between 40 and 200% by weight, based on the vinyl acetate input.

The final conversion is normally between 30 and 90%, preferably between 35 and 80%, based on the quantity of vinyl acetate input.

The main residence time is normally between 3 and 18 hours but shorter main residence times become possible with increasing VA content. Thus the residence time of types with a high VA content is between 3 and 8 hours and for types with a low VA content between 6 and 18 hours.

The copolymers prepared according to the invention generally have Mooney viscosities according to DIN 53 523 from 10 to 40 (ML 1+4 100° C.), molecular weights determined as weight average molecular weights $\overline{M}_w$ of 150,000 to 1,000,000, preferably of 200,000 to 500,000 (determined by light scattering) and molecular weights determined as number average molecular weights $\overline{M}_n$ of 15,000 to 200,000, preferably of 22,000 to 70,000 (determined by membrane osmometry in tetrahydrofuran). The dispersion index $$\frac{\overline{M}_w}{\overline{M}_n}$$

is generally between 2 and 15.

The gel content of the products may be determined by 24 hours extraction with dichloromethane in a Soxhlet Extractor. A "substantially gel free" product for the purpose of this invention must not contain more than 0.5% by weight and preferably contains not more than 0.2% by weight of insoluble residue, based on the copolymer.

The copolymers prepared according to the present invention may be used in the vulcanised or unvulcanised state. Preferred examples of their application in the unvulcanised state is their use as rheology modifiers for lubricants and hydraulic oils (e.g. medium fraction distillates according to DIN 7728 T1), as adhesive binders, in particular for hot melt adhesives, and as (plasticising) compounding components for thermoplasts, duroplasts and rubbers.

The quantities employed depend on the purpose for which the products are used. Thus rheology modifiers may be used in quantities starting from 1% by weight and hot melt adhesives in quantities of up to 100% by weight of the copolymers prepared according to the invention.

Suitable thermoplasts and duroplasts include e.g. PVC, polymethyl methacrylate, styrene and acrylonitrile copolymers including ABS, polyvinylidene chloride, polyesters including polycarbonates, polyamides, polyvinyl acetates, polyphenylene sulphide, polyethylene and thermoplastic polyesters such as polyalkylene terephthalates; unsaturated polyester resins and phenol/formaldehyde and amine/formaldehyde condensates.

The copolymers prepared according to the invention are used in the vulcanised form for most purposes. Vulcanisation may be carried out by cross-linking with peroxides or with polyfunctional, cross-linking compounds such as triallyl cyanurate, triallyl isocyanurate, bismaleinimides or divinyl benzene, optionally after the addition of fillers, stabilizers, etc.

Copolymers prepared according to the invention containing copolymerised residual comonomers with the reactive groups described above in addition to ethylene and vinyl acetate units may be cross-linked with other cross-linking agents, for example they may be cross-linked by salt vulcanisation with metal oxide such as zinc oxide, magnesium oxide or calcium oxide in the case of polymers containing carboxyl groups; with diamines or disulphides in the case of polymers containing epoxide and anhydride groups; with diisocyanates in the case of polymers containing hydroxyl groups; and with elementary sulphur or sulphur donors in the case of polymers containing double bonds or chlorine atoms or chemically incorporated carbon monoxide. Vulcanisation reaction such as vulcanisation with resin or cross-linking with quinones may be applied instead of the above-mentioned cross-linking reactions.

A product is regarded as "vulcanised" according to this invention if less than 3% by weight, preferably less than 1% by weight, based on the copolymer, can be extracted with tetrahydrofuran as extracting solvent during 10 hours in a Soxhlet extractor.

One important application of vulcanisates of copolymers prepared according to the invention is their use as compounding components for other rubbers, e.g. rubber-like homo- and copolymers of butadiene, isoprene, chloroprene, acrylonitrile, vinyl acetate, esters or acrylic or methacrylic acid and $C_1$ to $C_8$ mono- or dihydric alcohols; vinyl chloride or ethylene. The copolymers prepared according to the invention can be used in a wide range of quantities for these purposes, e.g. from 1 to 99% by weight, preferably from 10 to 90% by weight, especially from 10 to 40 and from 60 to 90% by weight, based on the mixture.

The copolymers can be added when they have already been vulcanised but in most cases the copolymers are added in the unvulcanised form to the as yet unvulcanised rubber, and the two are then vulcanised together.

The last embodiment may be applied to the preparation of compounds with thermoplasts such as ethylene/-vinyl acetate copolymers having VA contents from 1 to less than 30% by weight.

The copolymers prepared according to the invention may be used by their own or in the form of the compounds described above for the production of vulcanised moulded articles, sheet products and coatings of all types, e.g. for the formation of the outer sheaths of cables, cable inner lines, insulations, transport belts, power transmitters and hoses.

The percentages given in the following examples are based on weight; parts are parts by weight.

EXAMPLES

The EVA copolymers were examined in the test compounds described below:
- 100 parts of EVA copolymer,
- 3 parts of Rhenogran P 50, (mixture of 1 part of polycarbodiimide and 1 part of EVA with VA content of 45%),
- 3 parts of Rhenovin DDA-70 (stabilizer, styrenised diphenylamine),
- 190 parts of Apyral 120 (aluminium oxide, average particle size 1.5 $\mu$m),
- 2 parts of Ucarsil RC (filler; silane),
- 10 parts of zinc carbonate,
- 1 part of zinc stearate,
- 6 parts of Ingvorplast SRL (paraffinic mineral oil plasticiser),
- 0.7 parts of Rhenofit TAC/S (triallyl cyanurate) and
- 6 parts of Perkadox 14/40 (bis-tert.-butyl-peroxydiisopropyl benzene).

Plates were pressed from the test compound and vulcanised at 170° C. under a pressure of 200 bar for 20 minutes. Testing samples were punched out of the plates. The tensile strength was determined on standard rods S 2 according to DIN 53 504 and the tear strength was determined on a sample strip according to DIN 53 507.

EXAMPLE 1

A train of 5 stirred high pressure autoclaves in series each having a capacity of 4 to 6 m$^3$ was continuously filled with
- 1450 kg/h of ethylene,
- 1930 kg/h of a mixture of 36 parts of VA and 64 parts tert.-butanol,
- 1.5 kg/h of methacrylic acid anhydride and
- 177 kg/h of a mixture of 10.9 parts of azodimethyl valeronitrile, 641 parts of tert.-butanol and 361 parts of VA.

The reaction was carried out at a pressure of 300 bar and at reaction temperatures of 58° C., 60° C., 62° C., 64° C. and 68° C. At 72% conversion, a copolymer showing the following properties was obtained:
- VA content: 42%,
- 26 ML (1+4) 10° C.,
- Tensile strength (test compound): 16 MPa and
- Tear strength (test compound): 8 N/mm.

EXAMPLE 2

A process analogous to that of Example 1 was carried out with
- 1140 kg/h of ethylene,
- 1700 kg/h of a mixture of 50 parts of VA and 50 parts of tert.-butanol,
- 1.8 kg/h of methacrylic acid anhydride and
- 122 kg/h of a mixture of 410 parts of VA, 790 parts of tert.-butanol and 14.4 parts of azodimethyl valeronitrile.

The internal temperatures of the reactor were 62° C., 64° C., 64° C., 68° C. and 70° C. At 76% conversion, a copolymer showing the following properties was obtained:
- VA content: 50%
- 24 ML (1+4) 100° C.,
- Tensile strength (test compound): 15.5 MPa and
- Tear strength (test compound): 5.5 N/mm.

EXAMPLE 3

Process analogous to that of Example 1 in 4 reactors, into which were introduced
- 900 kg/h of ethylene,
- 2160 kg/h of mixture of 50 parts of VA and 50 parts of tert.-butanol,
- 21 kg/h of methacrylic acid anhydride and
- 127.5 kg/h of a mixture of 0.9 parts of azo-bis-methoxy dimethylvaleronitrile, 468 parts of VA and 832 parts of tert.-butanol.

The internal temperatures of the reactors were 62° C., 64° C., 66° C. and 70° C. At 68% conversion, a copolymer showing the following properties was obtained:
- VA content: 70.3%,
- 16 ML (1+4 100° C.,
- Tensile strength (test compound): 13 MPa and
- Tear strength (test compound): 6 N/mm.

EXAMPLE 4

Process analogous to that of Example 2 at the following internal temperatures of the reactors: 65° C., 70° C., 70° C., 75° C., 80° C. The initiator solution contained 16.8 kg of tert.-butyl perpivalate. At a conversion of 74%, a copolymer showing the following properties was obtained:
- VA content: 49.8%,
- 23 ML (1+4) 100° C.
- Tensile strength (test compound): 13.0 MPa and Tear strength (test compound): 4.0 N/mm.

COMPARISON 1

Process analogous to that of Example 1 without the addition of methacrylic acid anhydride. At a conversion of 71%, a copolymer showing the following properties was obtained:

VA content: 50.5%,
24 ML (1+4) 100° C.,
Tensile strength (test compound): 13.8 MPa and
Tear strength (test compound): 6.1 N/mm.

COMPARISON 2

Process analogous to that of Example 3 without the addition of acrylic acid anhydride. At 71% conversion, a copolymer showing the following properties was obtained:

VA content: 69.5%,
17 ML (1+4) 100° C.,
Tensile strength (test compound): 10.7 MPa and
Tear strength (test compound): 4.8 N/mm.

We claim:

1. Ethylene/vinyl acetate copolymers having a gel content of not more than 0.5% by weight (determined by 24 hours extraction with dichloromethane in a Soxhlet extractor) containing from 30 to 90% by weight of vinyl acetate incorporated by polymerisation and 50 ppm to 1% by weight of copolymerised (meth)-acryloyl compounds containing at least two acryloyl or (meth)acryloyl groups per molecule produced by solution polymerisation of the monomers at pressures from 200 to 1000 bar and temperatures from 25° to 100° C. wherein the polymerisation is carried out in the presence of 50 ppm to 1% by weight, based on the polymerisable monomers put into the process, of (meth)acryloyl compounds containing at least two acryloyl or methacryloyl groups per molecule.

2. Ethylene/vinyl acetate copolymers according to claim 1 having a gel content of not more than 0.2% by weight.

* * * * *